United States Patent Office 3,567,785
Patented Mar. 2, 1971

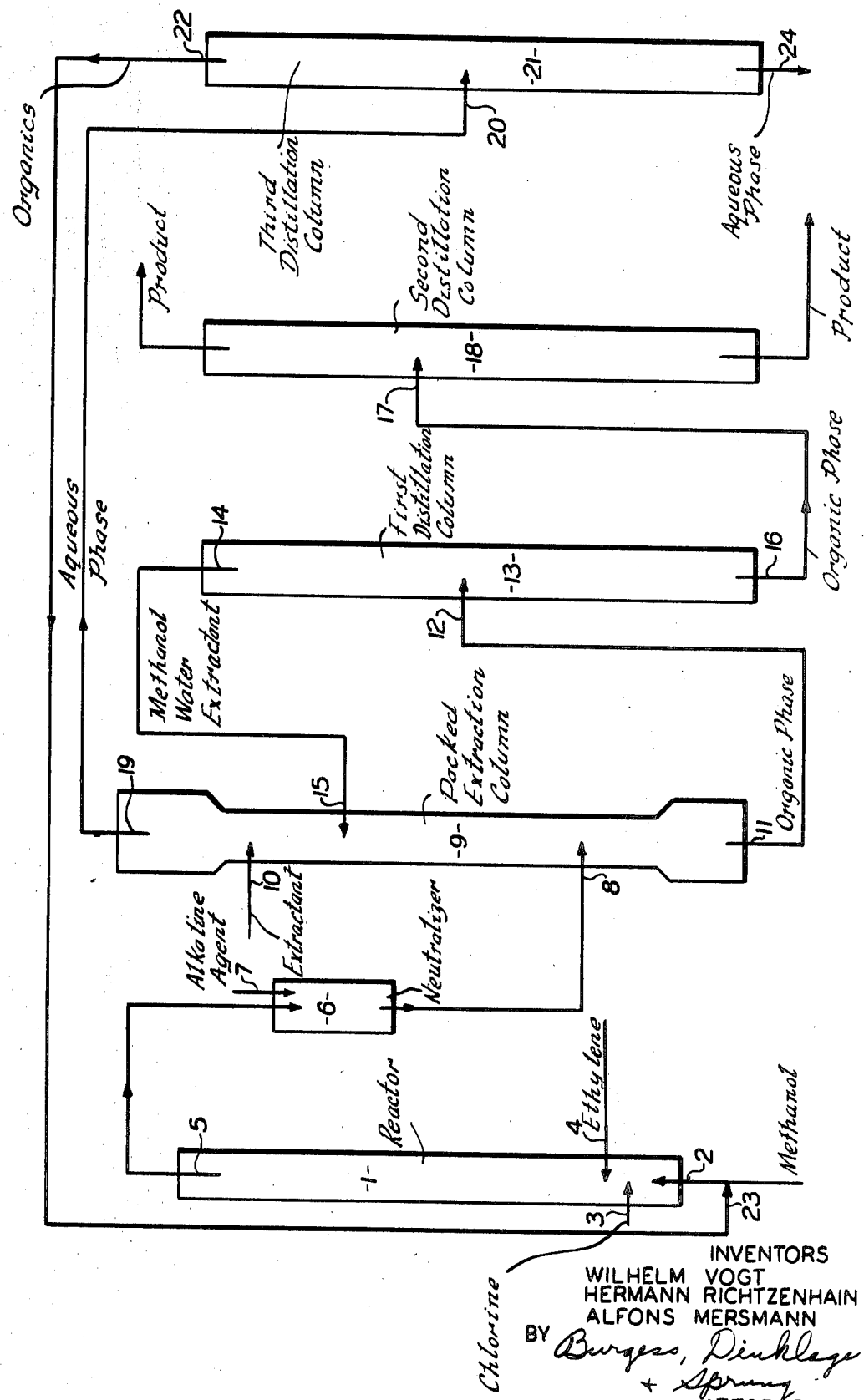

3,567,785
METHOD OF ISOLATING METHOXYETHYL-CHLORIDE
Wilhelm Vogt, Cologne-Sulz, Hermann Richtzenhain, Post Marialinden, Gemeinde Much, and Alfons Mersmann, Ranzel, Germany, assignors to Dynamit Nobel Aktiengesellschaft, Troisdorf, Germany
Filed Dec. 20, 1967, Ser. No. 691,997
Claims priority, application Germany, Dec. 30, 1966,
D 51,917
Int. Cl. C07c 41/12
U.S. Cl. 260—616       5 Claims

ABSTRACT OF THE DISCLOSURE

Separation of methoxyethylchloride from a mixture thereof with methanol, water and dichloroethane by liquid-liquid extraction with a halogenated hydrocarbon, an aromatic hydrocarbon, or an ether which is immiscible with water and with a mixture of methanol, dichloroethane and methoxyethyl chloride.

---

The present invention relates to a method of recovering methoxyethylchloride from a solution obtained by chloralkoxylation of ethylene with chlorine in the presence of methanol.

The formation of methoxyethylchloride by chloralkoxylation of ethylene with chlorine in the presence of methanol as solvent is already known (Zhur, Priklaud. Khim. 31, 1880 (1958).

The solution obtained upon the chloralkoxylation contains, in addition to methanol as the main component, also methoxy ethylchloride and 1,2-dichloroethane as well as hydrochloric acid. The proportion of methoxyethyl chloride to 1,2-dichloroethane can vary within wide limits and is dependent on the molar ratio of chlorine and ethylene, on the one hand, to the methanol used, on the other hand. In order to obtain the highest possible yield of methoxyethylchloride and, at the same time, obtain a high concentration of product in the methanol, this molar ratio should lie within the range of about 1:3 to 1:20, and preferably 1:6 to 1:10.

The solution obtained upon the chloralkoxylation of ethylene can be treated with alkaline agents of the alkali metal or alkaline earth metal group, or possibly with water or aqueous alkali metal and/or alkaline earth metal salt solutions. The ratio of the organic compounds to water should be about 4:1 to 1:4, and preferably about 2:1 to 1:2.

The concentration of the alkali or alkali-earth solution used for the neutralization of the chloralkoxylation solution is preferably so selected as to obtain a metal chloride solution which is as saturated as possible while maintaining a ratio of water to organic solution of about 2:1 to 1:2.

The neutralization can, however, also be effected with solid alkali agents.

Upon this chloralkoxylation, methoxyethylchloride is produced in addition to a not unsubstantial quantity of 1,2-dichloroethane, as a result of the direct addition of chlorine to the double bond. Upon the formation of the β-chloroether, there is produced an equimolar quantity of hydrogen chloride which, as the reaction advances, strongly favors the direct chlorination of ethylene to 1,2-dichloroethane. By neutralizing the hydrogen chloride produced upon the chloralkoxylation with alkali, the addition of chlorine to ethylene can be maintained within bearable limits, but the formation of 1,2-dichloroethane cannot be completely suppressed.

In the most favorable case, there is obtained a mixture of reaction products which consists of about 90% methoxyethylchloride and 10% 1,2-dichloroethane in excess methanol. Separation of this mixture into its individual components is difficult since the working with said solution by direct distillation is not possible.

Both methoxyethylchloride and 1,2 - dichloroethane form with methanol azeotropic mixtures whose boiling points at normal pressure differ by about only 2° C. and are close to the boiling point of methanol.

It is therefore an object of this invention to provide a novel method of resolving a mixture of 1,2-dichloroethane and 2-methoxyethylchloride.

It is another object of this invention to provide a method of extracting 2-methoxyethylchloride from a solution thereof in methanol.

Other and additional objects of this invention will become apparent from a consideration of this entire specification, including the claims and drawing hereof.

In accord with and fulfilling these objects, one aspect of this invention resides in the resolution of a mixture comprising 2 - methoxyethylchloride, 1,2 - dichloroethane and methanol by subjecting said mixture to liquid-liquid extraction with a liquid material which is immiscible with said mixture and with water. More specifically, the mixture being extracted comprises 2-methoxyethylchloride, 1,2-dichloroethane, methanol, hydrochloric acid, and alkali and/or alkaline earth metal chlorides. Water is associated with this mixture.

The extraction may be carried out co- or counter-current, but is preferably carried out in a counter-current manner.

For the extraction of methoxyethylchloride from the water-diluted solution of the chloralkoxylation, there are suitable only those solvents which do not form an azeotropic mixture with methoxyethylchloride and which, upon addition to a water-diluted solution of the chloralkoxylation, form a two-phase system. As solvents which are suitable for the extraction, mention may be made of halogenated, aliphatic hydrocarbons such as methylene chloride, chloroform, carbon tetrachloride, 1,2-dichloroethane, perchloroethylene, hexachlorbutadiene; aliphatic hydrocarbons such as petroleum ether; and aromatic hydrocarbons such as benzene, toluene, xylene; etc.

All organic components can be recovered from the aqueous phase obtained upon extraction by distillation and used again for the chloralkoxylation.

A continuous counter-current apparatus suitable for the process is shown in the enclosed drawing.

In a reactor 1, which is cooled in order to remove the heat of reaction, ethylene is reacted with chlorine in the presence of methanol to form methoxyethylchloride and 1,2-dichloroethane. Methanol is added to the reactor 1 at 2, chlorine at 3 and ethylene at 4. The chloralkoxylation mixture emerges from the reactor at 5 and consists of methanol, methoxyethylchloride, 1,2-dichloroethane and hydrochloric acid. This mixture can be neutralized at 6 by addition of an alkaline agent 7 and returned at 8 to a counter-current extraction column 9 which is filled with packing bodies. An extraction agent is fed at 10 to the column 9. After extraction, the organic phase leaves the extraction column at 11 and is fed at 12 to a first distillation column 13 in which small quantities of methanol and water together with the extractants are distilled off as an azeotrope at 14. The azeotrope is then fed at 15 back to the extraction column.

The organic phase, which is freed of small quantities of water and methanol, leaves the first distillation column 13 at 16 and is then fed at 17 to a second distillation column 18 for resolution into its individual components. Upon the extraction with 1,2-dichloroethane as extractant, the embodiment shown in the accompanying drawing is sufficient.

When using another extractant, a further distillation column is required in order to prepare the methoxyethylchloride in pure form. The aqueous phase leaves the extraction column 9 at 19 and is fed back at 20, in order to recover the organic components, to a third distillation column 21. The organic components contained in the aqueous phase, methanol with small quantities of extractant and methoxyethylchloride, are withdrawn at 22 with a water content of less than 1% and can be fed again to the reactor 1 at 23. An aqueous phase which has been freed of organic components leaves the distillation column 21 at 24.

This invention will be illustrated by the following examples which are in no way limiting upon the scope hereof:

EXAMPLE 1

In the reactor 1, 28.1 mols of chlorine and 30 mols of ethylene in 12.5 kilograms of methanol are converted at 0 to +5° C. during the course of 6 hours continuously to form 1.857 kilograms methoxyethylchloride and 0.84 kilogram of 1,2-dichloroethane, as well as 0.540 kilogram of hydrochloric acid. This solution was neutralized in 6 by continuous addition of 0.595 kilogram of caustic soda dissolved in 15 kilograms of water, and extracted in the extraction column 9 with 16 kilograms of 1,2-dichloroethane continuously in counter-current. The extraction ratio of solution to water to extractant was about 1:1:1. The organic phase obtained upon the extraction contained 1.830 kilograms of methoxyethylchloride=98.5% of the quantity used with a water content of 0.42% and a methanol content of 1.8%. The organic phase was freed in the distillation column 13 from small quantities of methanol and water which were distilled over on top as azeotrope with 1,2-dichloroethane. The mixture was distilled off at 14, consisting of 45.6% methanol, 43.8% 1,2-dichloroethane and 10.8% water, and was returned to the extraction column 9. The organic phase which was freed of water and methanol was separated in the distillation column 18 into 1,2-dichloroethane and methoxyethylchloride. The organic compounds were distilled off in the distillation column 21 from the aqueous phase of the extraction. The resultant distillate consisted of 93.8% methanol, 5.2%, 1,2-dichloroethane, 0.8% water and 0.2% methoxyethylchloride, and can be introduced again at 2 as methanolic component into the reactor 1 for the chloralkoxylation.

A similar result is obtained when the hydrochloric acid formed, instead of being neutralized with NaOH, is neutralized with calcium oxide, or calcium carbonate, and the indicated extraction ratio of solution to water to extractant is maintained.

EXAMPLE 2

In the same manner as in Example 1, there was prepared by chloralkoxylation of ethylene in the presence of methanol 21.6 kg. of solution which contained 2.673 kg. methoxyethylchloride. This solution was neutralized with 1.16 kg. of NaOH, dissolved in 15 kg. water, and extracted with 15 kg. of 1,2-dichloroethane in the extraction column in counter-current. The extraction ratio of solution to water to extractant was about 1.4:1:1. The organic phase obtained after the extraction contained 2.540 kg. methoxyethylchloride=95% of the quantity added with a water content of 0.5% and a methanol content of 7.95%. From the aqueous phase of the counter-current extraction, the organic components were recovered by distillation. There was obtained a solution which consisted of 95.16% methanol, 3.86% 1,2-dichloroethane, 0.98% methoxyethylchloride and 0.82% water.

EXAMPLE 3

In the same manner as in Example 1, there were prepared, by chloralkoxylation of ethylene in the presence of methanol, 16 kg. of solution which contained 2.316 kg. of methoxyethylchloride. This solution was neutralized with 0.98 kg. caustic soda solution dissolved in 10 kg. of water and extracted with 10.6 kg. of 1,2-dichloroethane in counter-current in the extraction colmn. The extraction ratio of solution to water to extractant was about 1.6:1:1. The organic phase obtained upon the extraction contained 2.050 kg. of methoxyethylchloride; namely, 88.8% of the quantity employed with a water content of 0.55% and a methanol content of 1.98%. From the aqueous phase of the counter-current extraction, there was obtained by distillation a solution which consisted of 92.1% methanol, 4.1% 1,2-dichloroethane, 3.0% methoxyethylchloride and 0.8% water.

EXAMPLE 4

16 kg. of methanolic solution, which contained 2.566 kg. of methoxyethylchloride and 2.013 kg. of 1,2-dichloroethane, were extracted after neutralization with aqueous NaOH with 14 kg. of perchloroethylene in counter-current. The extraction ratio of solution to water to extractant was 1.45:1:1.25. The organic phase obtained after the extraction contained 2.054 kg. of methoxyethylchloride; namely, 81.5% of the quantity employed, as well as 1.896 kg. of 1,2-dichloroethane, namely, 94.5 of the quantity employed, with a methanol content of 0.6% and a water content of 0.1%. Upon distillation of the aqueous phase, there was obtained a solution which consisted of 91.6% methanol, 5.8% methoxyethylchloride, 1.3% 1,2-dichloroethane, 0.6% perchloroethylene and 0.7% water.

What is claimed is:

1. A method of resolving a mixture comprising hydrochloric acid, 1,2-dichloroethane, 2-methoxyethylchloride and methanol which comprises neutralizing said hydrochloric acid with an aqueous alkaline material wherein the water present is in a ratio to said mixture of 4:1 to 1:4 and wherein the alkaline material is selected from the group consisting of sodium hydroxide, calcium oxide and calcium carbonate then forming an aqueous phase and an organic phase by extracting such 2-methoxyethylchloride from said mixture with a liquid extractant selected from the group consisting of methylene chloride, chloroform, carbon tetrachloride, 1,2-dichloroethane, perchloroethylene, hexachlorobutadiene, petroleum ether, benzene, toluene and xylene and recovering said 2-methoxyethylchloride from the organic phase created by said extraction.

2. Method claimed in claim 1 wherein the aqueous phase resulting from said extraction is distilled to recover the organic compounds therefrom.

3. Method claimed in claim 1, wherein the said mixture is produced by reacting chlorine and ethylene in a mole ratio of 1:3 to 1:20 in methanol.

4. Method claimed in claim 1, wherein said extractant is 1,2-dichloroethane and said alkaline material is sodium hydroxide.

5. Method claimed in claim 1, wherein said extractant is perchloroethylene and said alkaline material is sodium hydroxide.

References Cited

Seleznev, J. Applied Chem., U.S.S.R., vol. 31 (1958), pp. 1868–1873.

HOWARD T. MARS, Primary Examiner

U.S. Cl. X.R.

210—614